United States Patent Office 3,356,445
Patented Dec. 5, 1967

3,356,445
PROCESS FOR DYEING OR PRINTING NATURAL NITROGENOUS FIBROUS MATERIAL
Paul Ulrich, Basel, and Hans Heinrich Bosshard and Hans Niederer, Binningen, Switzerland, assignors to Ciba Limited, Basel, Switzerland, a Swiss company
No Drawing. Filed Aug. 5, 1964, Ser. No. 387,762
Claims priority, application Switzerland, Aug. 29, 1963, 10,665/63
16 Claims. (Cl. 8—54)

The present invention provides processes for coloring, i.e. dyeing or printing natural nitrogenous fibrous materials with dyestuffs that are soluble or dispersible in water, the material to be dyed being treated with an aqueous preparation having a temperature from 15° to 40° C. and containing at least 5%, referred to the weight of the preparation, of a solid or liquid nitrile whose N≡C group is linked with a carbon atom, or of cyanamide, the material so treated then being kept in the moist state for at least one hour at 15° to 40° C.

According to the present invention a wide variety of natural nitrogenous material, if desired blended with synthetic polyamide fibres, may be dyed or printed. Among others, there may be mentioned leather, skins (for example sheepskins), hairs, for example hairs of humans, goats, rabbits or hares, feathers, sisal (containing proteinic products embedded in cellulose) and silk. Particularly valuable results are obtained by dyeing or printing wool.

Dyestuffs suitable for use in the present processes are those which are soluble or only dispersible in water.

Preferred use is made of those water-soluble dyestuffs which owe their solubility in water to the presence of acid groups such as carboxylic acid groups or preferably of sulphonic acid groups or acid sulphuric acid ester groups. They may be reactive or unreactive with respect to the material to be dyed and may belong to a wide variety of types, being, for example, oxazine, triphenylmethane, xanthene, nitro, acridone or phthalocyanine dyestuffs, or more especially metallised or metal-free monoazo or polyazo dyes especially metallised or metal-free monoazo or polyazo dyes or anthraquinone dyestuffs. As representatives of the dyestuffs containing acid sulphuric acid ester groups there may be mentioned the indigosols. However, not only indigosols but also vat dyes may be used in the water-soluble oxidised state or in the form of their water-soluble leuco compounds in the process of this invention.

The term reactive dyestuffs, which otherwise may belong to any one of the types mentioned above, describes dyestuffs that are capable of forming a chemical, that is to say covalent, bond with the material to be dyed. Groupings capable of imparting this capacity to the dyestuffs are epoxy groups, ethyleneimino groups, isocyanate groups, isothiocyanate groups, carbamic acid aryl ester groups, the propiolic acid amide grouping, mono- and dichlorocrotonylamino groups, chloracrylamino groups, acrylamino groups; groupings that contain a labile substituent and can be split off with entrainment of the bond electron pair, for example sulphohalide groups; aliphatically bound sulphuric acid ester groups and aliphatically bound sulphonyl groups, and halogen atoms, especially an aliphatically bound chlorine atom; or the vinylacyl groups, for example the vinylsulphone groups and the carboxyvinyl group. These labile substituents are advantageously in position γ or β of an aliphatic residue which is bound with the dyestuff molecule directly or through an amino, sulphone or sulphonic acid amide group. If the relevant dyestuff contains as labile substituent a halogen atom, this mobile halogen atom may be present in an aliphatic acyl radical, for example in an acetyl radical, or in position β or α, β of a propionyl or acryl residue, or in a heterocyclic residue, for example in a pyrimidine, pyridazine or triazine ring. The dyestuffs contain advantageously a grouping of the formula

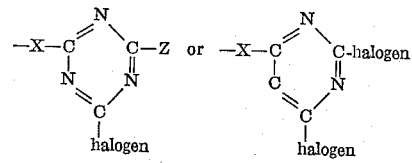

where X represents a nitrogen bridge and Z a hydrogen atom, a possibly substituted amino group, an etherified hydroxyl or mercapto group or a halogen atom or an alkyl, aryl or aralkyl group, and A stands for a hydrogen or halogen atom. The halogen atoms are, for example, bromine or preferably chlorine atoms.

Further suitable reactive groupings are the following residues: Trichlorpyridazine, dichloroquinoxaline, dichlorobutene, halogenated pyridazone, sulphonic acid dichloropropylamide, allylsulphone, allylsulphide, 2-halogenbenzthiazolecarbamide and β-sulphatopropionic acid amide residues.

Dyestuffs that are dispersible in water include those which, while being insoluble in water, are capable of forming in the finely dispersed state very fine aqueous dispersions at least with the aid of a dispersant. From such dispersions the dyestuffs deposit very durably on pelts.

The aqueous preparations of the invention must contain at least one solid or liquid nitrile.

The term nitrile is here used to describe compounds that contain at least one N≡C group attached by a covalent bound to a carbon atom, and among them those are preferred which correspond to the formula $$B-CH_2-CN$$

where B represents a hydrogen atom, a possibly substituted alkyl group, or a substitutent which imparts acidic or basic character. As examples of such compounds there may be mentioned, inter alia, acetonitrile and its homologues, malonic acid dinitrile and its homologues, iminoacetonitrile, dimethylaminoacetonitrile and its homologues, glycollic acid nitrile, and cyanacetic acid; compounds of the formula

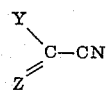

where Y represents a hydrogen atom or an alkenyl group and Z an alkenyl group, and Y and Z may also be linked together so as to form 5-membered or 6-membered cyclic compounds. As relevant examples there may be mentioned, inter alia, acrylonitrile and benzonitrile.

However, the present process is suitable for use not only of the nitriles defined above but also of cyanamide whose N≡C group is bound with an amino group.

The proportions of these compounds, or of combinations thereof, to be used may vary within wide limits; however, they should not be smaller than 5% and as a rule not greater than 50%, referred to the weight of the preparation as a whole, though a proportion ranging from 15 to 40% is preferred. The compound to be used may also be applied as combinations. It is also possible to treat the substratum separately with the dyestuffs and chemicals according to the invention. Thus, for example, a woollen fabric may first be padded with the dyestuff solution and then slop-padded with the separately prepared chemical liquor. Alternatively, the reverse procedure may be adopted, the material being first padded with the chemical liquor and then impregnated with the dyestuff solution.

Apart from the compounds necessary for the present process the aqueous preparations may also contain the additives generally used in dyeing and printing, for example surface-active anionic or nonionic assistants, thickeners, and also electrolytes or acids or bases, depending on the type of dyestuff concerned. When a thickener is added it must be ensured that it is compatible with the liquor, that is to say it must suit the acid or alkaline reaction of the individual liquor. In addition, the dye preparations may also contain hydrophilic compounds that are at most only restrictedly soluble in water, for example n-butanol or benzyl alcohol.

It has been found particularly favourable, more especially to prevent a possible grey fogging, to add a coacervating agent, that is to say a compound capable of forming with water a two-phase system. Both phases, the one containing more and the other less of the assistant, contain water as the solvent. Such compounds may belong to a wide variety of compounds. In this context, therefore, reference is made only to the phenomenon of coacervation, which is easy to demonstrate in a test tube or under a microscope.

The present process is suitable for dyeing or printing natural nitrogenous fibrous materials. The dyeing may be carried out according to the exhaustion method or by impregnation, that is to say on a padder. Printing, too, may follow the usual practice, the Vigoureux printing method being preferred. The aqueous preparations should be used at a temperature ranging from 15° to 40° C., preferably from 25° to 35° C.

The material treated with the dye preparations is then left to itself, while making sure that the prepartaion does not dry on the material. This is preferably ensured by wrapping the material in a plastic foil or keeping it in a closed vessel or room. The storing temperature may vary from 15° to 40° C., preferably from 25° to 35° C. The storing time may vary within very wide limits and is advantageously at least 1 hour and at most 48 hours. As a rule, storing for 10 to 20 hours ensures good results. To finish off the dyeings and prints it is as a rule sufficient to use a vigorous cold and hot rinse.

Especially delicate materials such for example as feathers, are advantageously dyed by the exhaustion method. In this case the storing in the moist state can be dispensed with and the material may be left to itself, instead of outside the liquor, within the dye liquor, for a time equal to the storing period referred to above.

It is a special advantage of the present process that cold working is possible, especially when continuously dyeing or printing woollen fabrics or loose wool. Accordingly, the present process is not only exceptionally mild but is very effective and requires little apparatus and an economical, low investment of heat.

Unless otherwise indicated, parts in the following examples are by weight.

*Example 1*

A solution of 30 parts of the dyestuff of the formula

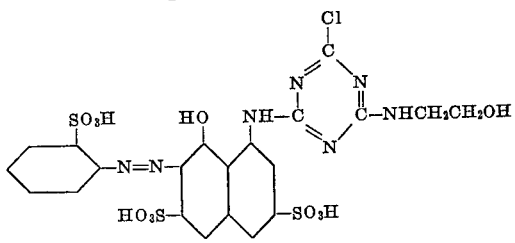

400 parts of propionitrile and 10 parts of a 25% aqueous solution of an adduct from 8 mols of ethylene oxide with 1 mol of para-tertiary octylphenol is diluted with water to 1000 parts by volume.

This liquor is heated to 20 to 40° C. and used for padding a woollen fabric to a weight increase of 75%, immediately afterwards rolled up and kept in this state for 14 hours at 30° C., making sure the material cannot dry. After storing the unfixed proportion of dyestuff is removed by a thorough rinse in cold and in warm water.

The resulting fast red dyeing is of a substantially greater tinctorial strength than when dyeing is performed in the absence of propionitrile. Instead of the above-mentioned ethylene oxide adduct there may be used an equal amount of sodium diisobutyl-naphthalenesulphonate.

*Example 2*

30 parts of the dyestuff of the formula

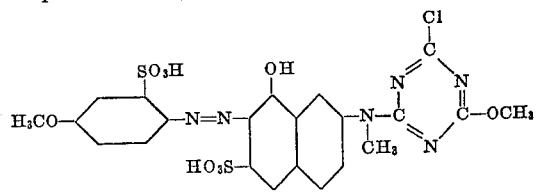

together with 400 parts of acetonitrile and 40 parts of a 44% aqueous solution of the ammonium salt of the acid sulphuric acid ester of an adduct from 2 mols of ethylene oxide with 1 mol of para-tertiary nonylphenol are dissolved in 400 parts of boiling water. When all has dissolved, the solution is diluted with cold water to 1000 parts by volume.

The liquor, which may have a temperature from 20° to 40° C., is used to pad a woollen fabric to a weight increase of 75%; it is then immediately rolled up and kept in this state for 14 hours at 30° C., making sure that it cannot dry. After the storing, the unfixed proportion of dyestuff is removed by a good rinse in cold and in warm water.

The resulting red dyeing is of substantially greater tinctorial strength than when dyeing is performed in the absence of acetonitrile.

Similar good results are obtained by using, instead of acetonitrile, propionitrile, acrylonitrile, malonic acid dinitrile, succinic acid dinitrile, iminoacetonitrile or glycollic acid nitrile.

Instead of the dyestuff used above there may be used any one of the following dyestuffs:

| No. | Formula | Shade |
|---|---|---|
| 1 | (structure shown) | Red. |

| No. | Formula | Shade |
|---|---|---|
| 2 | (structure) | Red. |
| 3 | (structure) | Yellow. |
| 4 | (structure) | Blue. |
| 5 | (structure) | Red. |
| 6 | (structure) | Orange-red. |
| 7 | (structure) | Yellow. |
| 8 | (structure) | Scarlet. |

| No. | Formula | Shade |
|---|---|---|
| 9 | Cu—Pc—(3)⟨—(SO₃H)₂.₅ / —(SO₂—NH—CH₂—CH₂—Cl)₁.₅⟩ (Cu—PC = residue of copper phthalocyanine) | Turquoise. |
| 10 | [structure with SO₃H, HO, NH—CO—, dichloroquinoxaline, HO₃S, SO₃H, azo linkage] | Red. |
| 11 | [anthraquinone with NH₂, NH—C₆H₄(SO₃H)—NH—CO—CH₂—CH₂—Cl] | Blue. |
| 12 | [pyrazolone azo dye with OH, N=N, SO₂—NH—CH₂—CH₂—O—SO₂OH, 1:2—cobalt complex] | Yellowish brown. |

Example 3

A padding liquor is prepared as described in Example 2 to which there are further added 20 parts of calcined sodium carbonate per 1000 parts of liquor.

Otherwise, the procedure of Example 2 is adopted; a strong red dyeing is obtained which has excellent properties of wet fastness.

Example 4

20 parts of the dyestuff of the formula

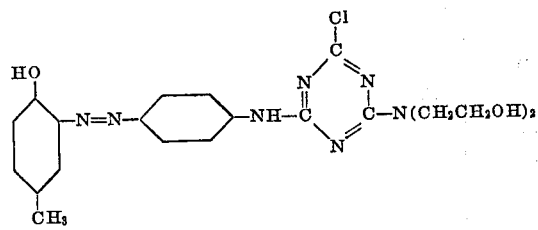

are dissolved together with 200 parts of benzonitrile and 500 parts of ethyleneglycol monomethyl ether and 200 parts of water and the whole is diluted with water to 1000 parts by volume.

A wool slubbing is padded with this liquor and then stored for 48 hours at 25° C. in a closed vessel and then given a good rinse in cold and in warm water.

The wool slubbing is dyed a yellow shade of greater tinctorial strength than when it is dyed in the absence of benzonitrile.

Example 5

A solution is prepared from 30 parts of the dyestuff of the formula

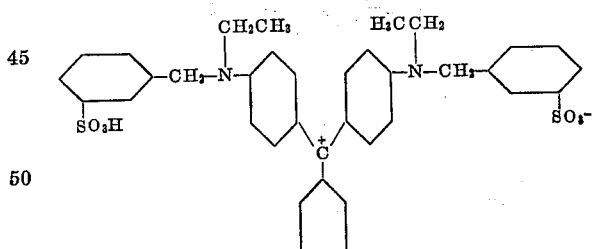

200 parts of diethylaminoacetonitrile, 40 parts of a 44% aqueous solution of the ammonium salt of the acid sulphuric acid ester of an adduct from 2 mols of ethylene oxide with 1 mol of para-tertiary nonylphenol and 10 parts of 85% formic acid and diluted with water to 1000 parts by volume.

A woollen fabric is padded with this liquor to a weight increase of 75%, then immediately rolled up and stored in this state for 14 hours at 30° C., making sure that the dyed material does not dry. After the storing, the unfixed proportion of dyestuff is removed by a thorough rinse in cold and in warm water.

The resulting green dyeing is distinctly more intense than when diethylaminoacetonitrile is omitted.

Similar good results are obtained when diethylaminoacetonitrile is replaced by β-dimethylaminopropionitrile.

Instead of the dyestuff used above there may be used an equal amount of the complex chromium compound containing for every atom of chromium 1 molecule of the dyestuff of the formula

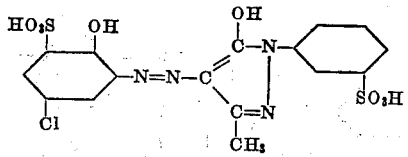

Instead of formic acid as above there may be used 10 parts of 96% sulphuric acid; in this manner a fast red dyeing is obtained which is of considerably greater tinctorial strength than when dyeing is performed in the absence of diethylaminoacetonitrile or β-dimethylaminopropionitrile.

Example 6

A padding liquor is prepared from: 30 parts of the complex chromium dyestuff containing for every atom or chromium 1 molecule of each of the dyestuffs of the formulae

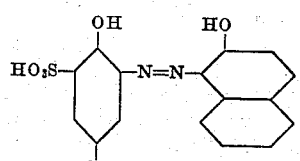

and

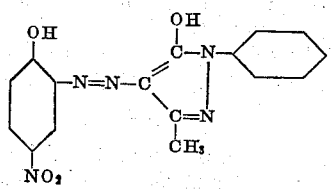

40 parts of a condensation product from 1 mol of coconut oil fatty acid and 2 mols of diethanolamine 200 parts of cyanamide, and 730 parts of water.

A chlorinated woollen fabric is padded with the above liquor at 40° C., rolled up and then stored for 48 hours at 30° C., making sure that it cannot dry. Finally, the fabric is given a thorough rinse in cold and in warm water.

The resulting brown dyeing is of a distinctly greater tinctorial strength than when dyeing is performed without adding cyanamide.

Example 7

A padding liquor is prepared from: 30 parts of the sulphuric acid leuco ester of the dyestuff of the formula

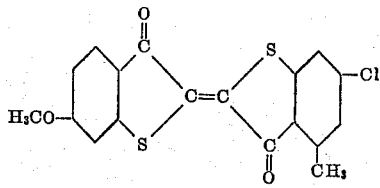

40 parts of 44% aqueous solution of the ammonium salt of the acid sulphuric acid ester of an adduct from 2 mols of ethylene oxide with 1 mol of para-tertiary nonylphenol, and 200 parts of glycollic acid nitrile are dissolved in 40 parts of boiling water and the solution is made up with cold water to 1000 parts by volume.

A woollen fabric is impregnated with this liquor, which has a temperature of 40° C. to 90% weight increase, then immediately rolled up and stored in this state for 14 hours at 30° C., making sure that it does not dry.

After storing, the dyeing is developed in a bath containing per 1000 parts of water, 5 parts of sodium nitrite and 10 parts of 96% sulphuric acid for 1 minute at 50° C., and then given a thorough rinse in cold and in hot water.

The resulting red dyeing is of substantially greater tinctorial strength than when glycollic acid nitrile is omitted.

Similar good results are obtained with the sulphuric acid leuco esters of the dyestuffs of the formula

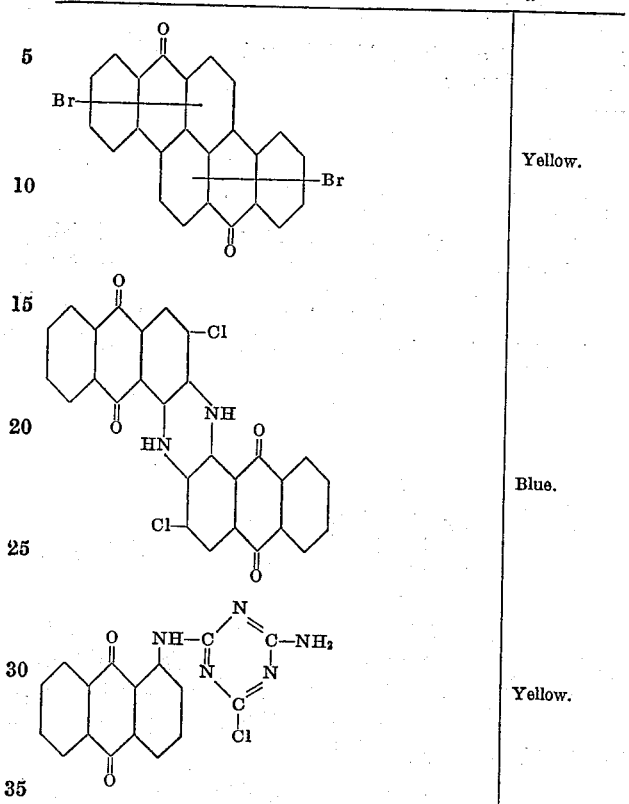

Example 8

A solution of 30 parts of the dyestuffs of the formula

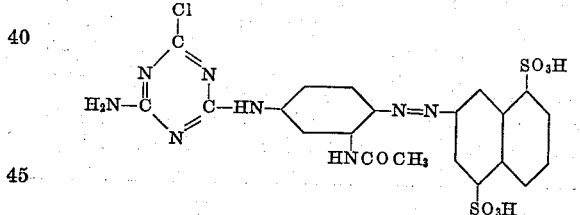

in 200 parts of boiling water is diluted with 250 parts of cold water. 20 parts of calcined sodium carbonate and 300 parts of sodium cyanacetate ($NC-CH_2COONa$) dissolved in 200 parts of water are then added.

A silk fabric is padded with this liquor to a weight increase of 90%, then immediately rolled up and kept in this state for 14 hours at 30° C. in a closed vessel. After the storing, the unfixed proportion of dyestuff is removed by a good rinse in cold and in hot water.

The resulting yellow dyeing has good properties of fastness and is of a substantially greater tinctorial strength than when dyeing without adding sodium cyanacetate.

Example 9

Pure woollen slubbings are printed on a Vigoureux printing machine to 50% cover. The padding liquor is composed of 20 parts of the dyestuffs of the formula

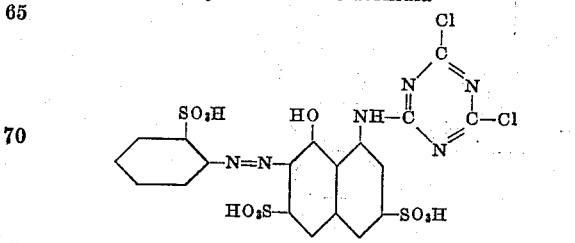

10 parts of etherified carubic acids.

40 parts of a 44% aqueous solution of the ammonium salt of the acid sulphuric acid ester of an adduct from 2 mols of ethylene oxide with 1 mol of paratertiary non-ylphenol,
200 parts of glycollic acid nitrile and
730 parts of water
___
1000 parts The printed slubbings are stored for 48 hours at 30° C. and a relative atmospheric humidity of 100%, then given a thorough cold and hot rinse.

The resulting red slubbing print is of greater tinctorial strength in the printed area than when glycollic acid nitrile is omitted.

*Example 10*

A padding liquor is prepared from 30 parts of the dyestuff of the formula

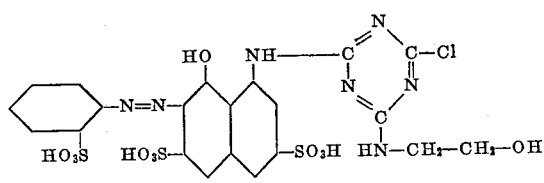

20 parts of a 45% aqueous solution of the ammonium salt of the acid sulphuric acid ester of an adduct from 2 mols of ethylene oxide with 1 mol of paratertiary nonylphenol
200 parts of cyanamide and
750 parts of water.

A woolen fabric is padded with the above liquor at 40° C. and then rolled up and stored for 24 hours at 30° C., making sure that the impregnated fabric cannot dry by wrapping it up in plastic foil. After the storing, the fabric is given thorough rinse in cold and in warm water.

The resulting red dyeing is of a distinctly greater tinctorial strength than when cyanamide is omitted.

Similar good results are obtained when the above dyestuff is replaced by one of the following dyestuffs:

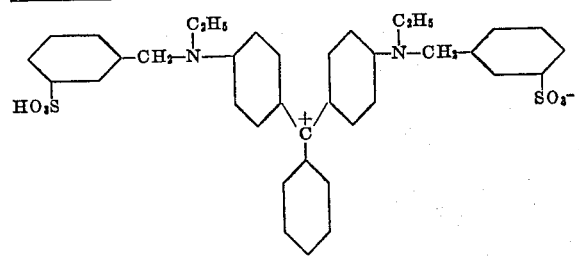
Green.

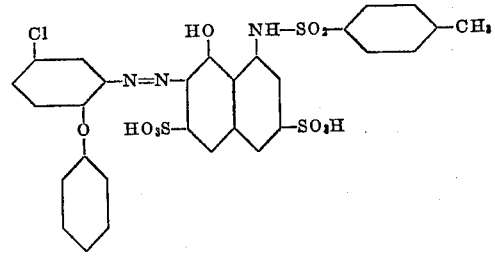
Ruby.

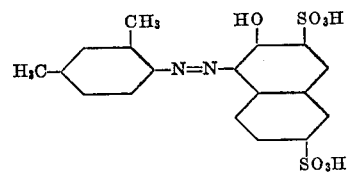
Scarlet.

*Example 11*

30 parts of the dyestuff of the formula

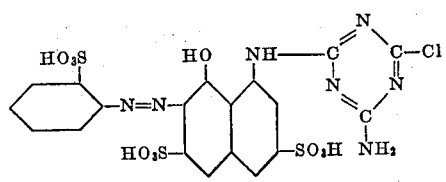

are dissolved in 400 parts of acetonitrile and the solution is made up with water to 1000 parts by volume.

A woollen fabric is padded with this liquor and then expressed to a weight increase of 75%. The impregnated fabric is rolled up, wrapped in a plastic foil and thus stored for 24 hours at 30° C. After this storing, the unfixed proportion of dyestuff is removed by a good rinse in cold and in warm water.

The resulting red dyeing is substantially stronger than when acetonitrile is not used in dyeing.

What is claimed is:

1. Process for coloring natural nitrogenous fibrous material with dyestuffs that are at least dispersible in water and are selected from the group consisting of water-soluble reactive dyestuffs, acid wool dyestuffs and metal complex dyestuffs applicable from acid to neutral baths, which process comprises treating the natural nitrogenous fibrous material with an aqueous preparation having a temperature from 15 to 40° C. and consisting of at least 5% of a nitrile selected from the group consisting of acrylonitrile, benzonitrile, nitriles of the formula $$B-CH_2-CN$$ 

wherein B represents a member selected from the group consisting of a hydrogen atom, a substituted alkyl radical, and unsubstituted alkyl radical, a substituent which imparts acidic character and a substituent which imparts basic character and $$H_2N-CN$$ 

and then storing the so-treated natural nitrogen fibrous material in the moist state at 15 to 40° C. for at least one hour.

2. Process for coloring wool with water-soluble reactive dyestuffs which process comprises treating the wool with an aqueous preparation having a temperature from 15 to 40° C. and consisting of at least 5% of a nitrile of the formula

B—CH₂—CN wherein B represents a member selected from the group consisting of a hydrogen atom, a substituted alkyl radical, an unsubstituted alkyl radical, a substituent which produces acidity and a substituent which produces basicity and then storing the so-treated wool in the moist state at 15 to 40° C. for at least one hour.

3. Process for coloring wool with water-soluble reactive dyestuffs which process comprises treating the wool with an aqueous preparation having a temperature from 15 to 40° C. and consisting of at least 5% of cyanamide and then storing the so-treated wool in the moist state at 15 to 40° C. for at least one hour.

4. Process for coloring wool with water-soluble reactive dyestuffs which process comprises treating the wool with an aqueous preparation having a temperature from 15 to 40° C. and consisting of at least 5% of a nitrile of the formula

B—CH₂—CN wherein B represents a member selected from the group consisting of a hydrogen atom, substituted alkyl radical, an unsubstituted alkyl radical, a substituent which produces acidity and a substituent which produces basicity and a non-ionic surface active agent and then storing the so-treated wool in the moist state at 15 to 40° C. for at least one hour.

5. Process for coloring wool with water-soluble reactive dyestuffs which process comprises treating the wool with an aqueous preparation having a temperature from 15 to 40° C. and consisting of at least 5% of a nitrile of the formula

B—CH₂—CN wherein B represents a member selected from the group consisting of a hydrogen atom, a substituted alkyl radical, an unsubstituted alkyl radical, a substituent which produces acidity and a substituent which produces basicity and an anion surface active agent and then storing the so-treated wool in the moist state at 15 to 40° C. for at least one hour.

6. Process for coloring wool with water-soluble reactive dyestuffs which process comprises treating the wool with an aqueous preparation having a temperature from 15 to 40° C. and consisting of at least 5% of a nitrile of the formula

B—CH₂—CN wherein B represents a member selected from the group consisting of a hydrogen atom, a substituted alkyl radical, an unsubstituted alkyl radical, a substituent which produces acidity and a substituent which produces basicity and a coacervating agent and then storing the so-treated wool in the moist state at 15 to 40° C. for at least one hour.

7. Process for coloring wool with water-soluble reactive dyestuffs which process comprises treating the wool with an aqueous preparation having a temperature from 15 to 40° C. and consisting of at least 5% of a nitrile of the formula

B—CH₂—CN wherein B represents a member selected from the group consisting of a hydrogen atom, a substituted alkyl radical, an unsubstituted alkyl radical, a substituent which produces acidity and a substituent which produces basicity, a coacervating agent and a non-ionic surface active agent and then storing the so-treated wool in the moist state at 15 to 40° C. for at least one hour.

8. Process for coloring wool with water-soluble reactive dyestuffs which process comprises treating the wool with an aqueous preparation having a temperature from 15 to 40° C. and consisting of at least 5% of a nitrile of the formula

B—CH₂—CN wherein B represents a member selected from the group consisting of a hydrogen atom, a substituted alkyl radical, an unsubstituted alkyl radical, a substituent which produces acidity and a substituent which produces basicity, a coacervating agent and an anion surface active agent and then storing the so-treated wool in the moist state at 15 to 40° C. for at least one hour.

9. Process for coloring wool with water-soluble reactive dyestuffs which process comprises treating the wool with an aqueous preparation having a temperature from 15 to 40° C. and consisting of at least 5% of cyanamide and a non-ionic surface active agent and then storing the so-treated wool in the moist state at 15 to 40° C. for at least one hour.

10. Process for coloring wool with water-soluble reactive dyestuffs which process comprises treating the wool with an aqueous preparation having a temperature from 15 to 40° C. and consisting of at least 5% of cyanamide and an anionic surface active agent and then storing the so-treated wool in the moist state at 15 to 40° C. for at least one hour.

11. Process for coloring wool with water-soluble reactive dyestuffs which process comprises treating the wool with an aqueous preparation having a temperature from 15 to 40° C. and consisting of at least 5% of cyanamide and a coacervating agent and then storing the so-treated wool in the moist state at 15 to 40° C. for at least one hour.

12. Process for coloring wool with water-soluble reactive dyestuffs which process comprises treating the wool with an aqueous preparation having a temperature from 15 to 40° C. and consisting of at least 5% of cyanamide, a coacervating agent and a non-ionic surface active agent and then storing the so-treated wool in the moist state at 15 to 40° C. for at least one hour.

13. Process for coloring wool with water-soluble reactive dyestuffs which process comprises treating the wool with an aqueous preparation having a temperature from 15 to 40° C. and consisting of at least 5% of cyanamide, a coacervating agent and an anionic surface active agent and then storing the so-treated wool in the moist state at 15 to 40° C. for at least one hour.

14. Process for coloring wool with a water-soluble reactive azo dyestuff which process comprises impregnating the wool with an aqueous preparation having a temperature from 15 to 40° C. and consisting of 15 to 40% of acetonitrile, and the ammonium salt of the acid sulfuric acid ester of the adduct from 2 mols of ethylene oxide with 1 mol of para-tertiary nonylphenol and then storing the so-treated wool in the moist state at 15 to 40° C. for at least one hour.

15. Process for coloring wool with a water-soluble reactive azo dyestuff which process comprises impregnating the wool with an aqueous preparation having a temperature from 15 to 40° C. and consisting of 15 to 40% of malonic acid dinitrile and the ammonium salt of the acid sulfuric acid ester of the adduct from 2 mols of ethylene oxide with 1 mol of para-tertiary nonylphenol and then storing the so-treated wool in the moist state at 15 to 40° C. for at least one hour.

16. Process for coloring wool with a water-soluble reactive azo dyestuff which process comprises impregnating the wool with an aqueous preparation having a temperature from 15 to 40° C. and consisting of 15 to 40% of cyanamide and the ammonium salt of the acid sulfuric acid ester of the adduct from 2 mols of ethylene oxide with 1 mol of para-tertiary nonylphenol and then storing the so-treated wool in the moist state at 15 to 40° C. for at least one hour.

(References on following page)

References Cited

UNITED STATES PATENTS

| | | | |
|---|---|---|---|
| 2,238,949 | 4/1941 | Schlack | 8—113 |
| 3,129,052 | 4/1964 | Dawson et al. | 8—54 |
| 3,208,990 | 9/1965 | Benz et al. | 8—43 X |
| 3,223,470 | 12/1965 | Boedeker et al. | 8—54 X |

FOREIGN PATENTS 1,273,731  9/1961  France.

OTHER REFERENCES

R. Casty: Melliand Textiber, 41, 11 (1960) pp. 1365–1372 and 1375.

V. Einsele: SVF-Fachorgan, 15, pp. 206–212, No. 3 (1960).

NORMAN G. TORCHIN, *Primary Examiner.*

J. TRAVIS BROWN, *Examiner.*

T. J. HERBERT, *Assistant Examiner.*